United States Patent
Si et al.

(10) Patent No.: US 11,057,872 B2
(45) Date of Patent: Jul. 6, 2021

(54) METHOD AND DEVICE FOR TRANSMITTING UPLINK CONTROL INFORMATION

(71) Applicant: China Academy of Telecommunications Technology, Beijing (CN)

(72) Inventors: Qianqian Si, Beijing (CN); Xuejuan Gao, Beijing (CN); Xueming Pan, Beijing (CN); Jiaqing Wang, Beijing (CN)

(73) Assignee: China Academy of Telcommunications Technology, Beijing (CN)

( * ) Notice: Subject to any disclaimer, the term of this patent is extended or adjusted under 35 U.S.C. 154(b) by 386 days.

(21) Appl. No.: 16/075,146

(22) PCT Filed: Jan. 24, 2017

(86) PCT No.: PCT/CN2017/072498
§ 371 (c)(1),
(2) Date: Aug. 3, 2018

(87) PCT Pub. No.: WO2017/133596
PCT Pub. Date: Aug. 10, 2017

(65) Prior Publication Data
US 2020/0170004 A1    May 28, 2020

(30) Foreign Application Priority Data
Feb. 4, 2016   (CN) .......................... 201610080061.2

(51) Int. Cl.
*H04W 72/04*   (2009.01)
*H04W 16/14*   (2009.01)
(Continued)

(52) U.S. Cl.
CPC ....... *H04W 72/0413* (2013.01); *H04W 16/14* (2013.01); *H04W 72/02* (2013.01); *H04W 72/0453* (2013.01); *H04W 74/0808* (2013.01)

(58) Field of Classification Search
CPC ............. H04W 72/0413; H04W 72/02; H04W 72/0453; H04W 72/085; H04W 16/14; H04W 74/0808; H04W 74/0816
See application file for complete search history.

(56) References Cited

U.S. PATENT DOCUMENTS

2010/0272048 A1   10/2010   Pan et al.
2014/0362780 A1   12/2014   Malladi et al.
(Continued)

FOREIGN PATENT DOCUMENTS

CN    102648646 A    8/2012
CN    1045402320 A   4/2015
(Continued)

*Primary Examiner* — Farid Seyedvosoghi
(74) *Attorney, Agent, or Firm* — Kilpatrick Townsend & Stockton, LLP

(57) ABSTRACT

Disclosed are a method and device for transmitting uplink control information, which are used for realizing a UE performing switching transmission of an uplink control channel on subframes and carriers, so that if the UE fails to pre-empt a resource on an unlicensed carrier, the UE may switch to the other carriers for transmission or continue to try to perform LBT in subsequent subframes, so as to ensure the timely and correct transmission of the uplink control information. The method comprises: a UE determining a physical uplink control channel (PUCCH) switching carrier group and the maximum feedback delay.

17 Claims, 4 Drawing Sheets

A user equipment determines a PUCCH switching carrier group and a maximum feedback delay, where the PUCCH switching carrier group includes one licensed primary carrier and N unlicensed carriers, and N is an integer more than or equal to 1 — S101

The user equipment performs LBT detection for the unlicensed carriers in the PUCCH switching carrier group during the maximum feedback delay, and when the LBT detection succeeds, the user equipment selects one of the unlicensed carriers to transmit uplink control information; or when the LBT detection fails, the user equipment transmits the uplink control information over the licensed primary carrier — S102

(51) Int. Cl.
*H04W 72/02* (2009.01)
*H04W 74/08* (2009.01)

(56) References Cited

U.S. PATENT DOCUMENTS

| | | |
|---|---|---|
| 2015/0092702 A1 | 4/2015 | Chen et al. |
| 2015/0098397 A1 | 4/2015 | Damnjanovic et al. |
| 2015/0099525 A1 | 4/2015 | Ji et al. |
| 2015/0223075 A1 | 8/2015 | Bashar et al. |
| 2017/0118728 A1* | 4/2017 | Harada .................. H04W 16/14 |
| 2018/0199333 A1* | 7/2018 | Feng ....................... H04L 5/001 |

FOREIGN PATENT DOCUMENTS

| | | |
|---|---|---|
| CN | 105207754 A | 12/2015 |
| WO | 2015131730 A1 | 9/2015 |
| WO | 2016006450 A1 | 1/2016 |

* cited by examiner

METHOD AND DEVICE FOR TRANSMITTING UPLINK CONTROL INFORMATION

This application is a US National Stage of International Application No. PCT/CN2017/072498, filed on Jan. 24, 2017, designating the United States and claiming the benefit of Chinese Patent Application No. 201610080061.2, filed with the Chinese Patent Office on Feb. 4, 2016, and entitled "A method and apparatus for transmitting uplink control information". The entire content of each of the above applications is incorporated herein by reference.

FIELD

The present disclosure relates to the field of communications, and particularly to a method and apparatus for transmitting uplink control information.

BACKGROUND

Deployment of transmission over unlicensed spectrum resources is expected to be supported in a Long Term Evolution (LTE) system to improve user experience, and extend a coverage area. In order to enable the LTE system to operate in an unlicensed frequency band, a Licensed Assisted Access (LAA) has been defined so far, that is, a user equipment to access an unlicensed carrier shall firstly access a licensed primary carrier, where the unlicensed carrier can only operate as a secondary carrier. Since there are abundant unlicensed spectrum resources, the user equipment may receive data concurrently over a large number of unlicensed carriers, and if only transmission of an uplink control channel over the licensed primary carrier is supported, then there may be a too high overhead of uplink control channels over the licensed carrier, so it is necessary to transmit an uplink control channel over an unlicensed carrier. However, a resource over an unlicensed carrier is shared by various systems, and the user equipment shall firstly operate in the Listen Before Talk (LBT) mode before it performs uplink transmission, so sometimes the user equipment may be unable to access a channel, and if the user equipment fails to preempt a channel when it needs to transmit an uplink control channel, then uplink control information cannot be transmitted correctly in a timely manner.

Unlicensed spectrums have not been planned for any particular application system, but may be shared by various wireless communication systems, e.g., Bluetooth, WiFi, etc., where the various systems access shared unlicensed spectrum resources by preempting the resources. In order to guarantee transmission performance of an LTE user equipment, and to make better use of an unlicensed frequency band, the LBT mechanism shall be applied before data is transmitted in the unlicensed frequency band. In an LBT process, the user equipment performs Clear Channel Assessment (CCA) before it transmits data over a channel to determine whether there is any other signal over the channel through energy detection, so as to determine whether the channel is occupied or idle. The terminal transmits data only when the channel is idle. The LBT mechanism shall be applied in an unlicensed frequency band as specified in Europe and Japan. In addition to this, carrier sensing using the LBT mechanism is also a scheme of fair sharing in an unlicensed frequency band, so the LBT mechanism is a necessary characteristic of a globally uniform solution in an unlicensed frequency band.

While the LTE system is operating in an unlicensed frequency band, in order to enable the LTE system and other user equipment or system to share spectrum resources in a fair manner, an LTE base station shall operate with the LBT mechanism. On the user equipment side, it is scheduled by the base station to perform uplink transmission, and uplink scheduling signaling shall be transmitted at least four sub-frames before data is transmitted, so the base station cannot determine whether a channel of the user equipment side is occupied when scheduling the user equipment. An LBT process shall also be performed by each station before data is transmitted as specified in some regions, thus revealing a part of hidden nodes, and improving the performance of coexistence. Accordingly both the base station and the user equipment in an LAA need to compete for a resource over an unlicensed frequency band in the LBT mechanism.

The uplink control information is introduced as follows.

The uplink control information includes Acknowledgement (ACK)/Non-Acknowledgement (NACK), Channel State Information (CSI), and a Scheduling Request (SR). When the user equipment supports concurrent transmission of a Physical Uplink Control Channel (PUCCH) and a Physical Uplink Shared Channel (PUSCH), if there is no uplink data to be scheduled, then uplink control information is transmitted in the PUCCH, and if there is uplink data to be scheduled, then uplink control information is transmitted in the PUSCH, and uplink data is transmitted in a PUSCH, or a part of uplink control information is transmitted in the PUCCH, and another part of uplink control information and data is transmitted in the PUSCH. When the user equipment does not support concurrent transmission of the PUCCH and the PUSCH, if there is no uplink data to be scheduled, then the uplink control information is transmitted in the PUCCH, and if there is uplink data to be scheduled, then both uplink control information and data is transmitted in a PUSCH.

The PUCCH is introduced as follows.

Uplink control information is transmitted over a PUCCH. In an LTE-A Release 10 (Rel-10)/Release 11 (Rel-11) system, a PUCCH can only be transmitted over a primary carrier as specified in the standard. In an LTE-A Rel-12 system, a dual-connectivity scenario is supported, and the user equipment can be configured to operate over carriers served by a plurality of base stations, and the plurality of base stations connected with the user equipment schedule the user equipment separately in sets of carriers served by the respective base stations.

The base station specifies for each carrier group an uplink carrier for feeding back in a PUCCH uplink control information corresponding to downlink carriers in the carrier group, and different carrier groups correspond to different uplink carriers, as illustrated by FIG. 1. In an LTE-A Release 13 (Rel-13) system, aggregation of at most 32 carriers is supported, and in order to lower a load on a primary carrier, transmission of a PUCCH over a secondary carrier is also supported, which is not be limited to the dual-connectivity scenario, and at most two PUCCH carrier groups are supported.

In summary, in the existing technologies, a resource over an unlicensed carrier is shared by various systems, and the user equipment shall firstly operate in the LBT mode before it performs uplink transmission, so sometimes the user equipment may be unable to access a channel. If the user equipment fails to preempt a channel when it needs to transmit an uplink control channel, then uplink control information cannot be transmitted correctly in a timely manner.

SUMMARY

Embodiments of the disclosure provide a method and apparatus for transmitting uplink control information.

An embodiment of the disclosure provides a method for transmitting uplink control information. The method includes: determining, by a user equipment, a PUCCH switching carrier group and a maximum feedback delay, where the PUCCH switching carrier group includes one licensed primary carrier and N unlicensed carriers, and N is an integer more than or equal to 1; performing, by the user equipment, LBT detection for the unlicensed carriers in the PUCCH switching carrier group during the maximum feedback delay; and when the LBT detection succeeds, selecting one of the unlicensed carriers to transmit uplink control information; or when the LBT detection fails, transmitting the uplink control information over the licensed primary carrier.

In an embodiment, start time of the maximum feedback delay is time when a base station starts to transmit downlink data corresponding to feedback information.

In an embodiment, the start time of the maximum feedback delay is time when the user equipment needs to start to transmit the feedback information.

In an embodiment, if the LBT detection performed by the user equipment succeeds over M unlicensed carriers in the PUCCH switching carrier group, then the user equipment selects an unlicensed carrier among the M unlicensed carriers under a preset rule to transmit the uplink control information. M is an integer less than or equal to N.

In an embodiment, when the user equipment transmits the uplink control information over the licensed primary carrier, the user equipment transmits the uplink control information over the licensed primary carrier in a last sub-frame during the maximum feedback delay.

In an embodiment, when the user equipment transmits the uplink control information over the licensed primary carrier, the user equipment receives a transmission resource of the uplink control information indicated by a base station, and transmits the uplink control information over the licensed primary carrier in the transmission resource.

An embodiment of the disclosure provides another method for transmitting uplink control information. The method includes: determining, by a base station, a PUCCH switching carrier group and a maximum feedback delay, where the PUCCH switching carrier group includes one licensed primary carrier and N unlicensed carriers, and N is an integer more than or equal to 1; performing, by the base station, DTX detection for the unlicensed carriers in the PUCCH switching carrier group during the maximum feedback delay; and when the DTX detection succeeds, receiving uplink control information over an unlicensed carrier for which the DTX detection succeeds; or when the DTX detection fails, receiving the uplink control information over the licensed primary carrier.

In an embodiment, start time of the maximum feedback delay is time when the base station starts to transmit downlink data corresponding to feedback information.

In an embodiment, the start time of the maximum feedback delay is time when a user equipment needs to start to transmit the feedback information.

In an embodiment, when the base station determines that the uplink control information is to be received over the licensed primary carrier, the base station receives the uplink control information over the licensed primary carrier in a last sub-frame during the maximum feedback delay.

In an embodiment, when the base station determines that the uplink control information is to be received over the licensed primary carrier, the base station indicates a transmission resource of the uplink control information to a user equipment, and receives the uplink control information over the licensed primary carrier in the transmission resource.

An embodiment of the disclosure provides an apparatus for transmitting uplink control information. The apparatus includes a transmitter, a memory and a processor. The processor is configured to execute at least one instruction stored in the memory to: determine a PUCCH switching carrier group and a maximum feedback delay. The PUCCH switching carrier group includes one licensed primary carrier and N unlicensed carriers, and N is an integer more than or equal to 1. The processor is also configured to execute at least one instruction stored in the memory to: perform LBT detection for the unlicensed carriers in the PUCCH switching carrier group during the maximum feedback delay, and when the LBT detection succeeds, select one of the unlicensed carriers to transmit uplink control information; or when the LBT detection fails, control the transmitter to transmit the uplink control information over the licensed primary carrier.

In an embodiment, start time of the maximum feedback delay is time when a base station starts to transmit downlink data corresponding to feedback information.

In an embodiment, the start time of the maximum feedback delay is time when the apparatus needs to start to transmit the feedback information.

In an embodiment, if the LBT detection performed by the processor succeeds over M unlicensed carriers in the PUCCH switching carrier group, then the processor is further configured to execute the at least one instruction to select an unlicensed carrier among the M unlicensed carriers under a preset rule to transmit the uplink control information. M is an integer less than or equal to N.

In an embodiment, the processor is further configured to execute the at least one instruction to control the transmitter to transmit the uplink control information over the licensed primary carrier in a last sub-frame during the maximum feedback delay.

In an embodiment, the apparatus further includes a receiver. The processor is further configured to execute the at least one instruction to: control the receiver to receive a transmission resource of the uplink control information indicated by a base station, and control the transmitter to transmit the uplink control information over the licensed primary carrier in the transmission resource.

DETAILED DESCRIPTION OF THE EMBODIMENTS

Embodiments of the disclosure provide a method and apparatus for transmitting uplink control information so as to enable a user equipment to switch between carriers to transmit an uplink control channel in a plurality of sub-frames, so that if the user equipment fails to preempt a resource over an unlicensed carrier, it may switch to another carrier for transmission or continues to perform an LBT process in a subsequent sub-frame, thus enabling the uplink control information to be transmitted correctly in a timely manner.

The technical solutions according to the embodiments of the disclosure are applicable to a scenario where one licensed primary carrier and one or more unlicensed carriers are aggregated for a user equipment, and generally include the following operations.

Operations at the User Equipment Side

Figure 1:
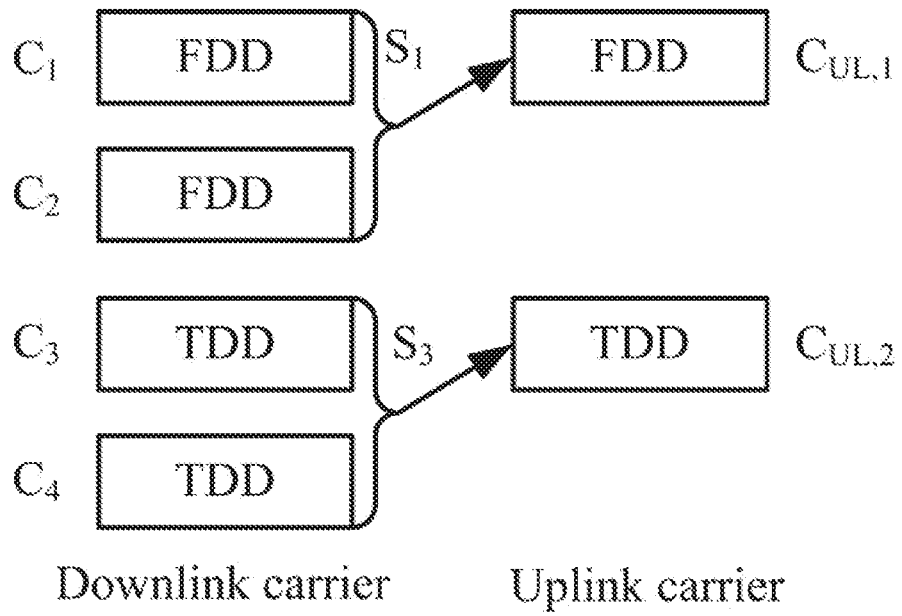
FIG. 1 is a schematic diagram of transmitting a PUCCH over a plurality of carriers in an existing technology.
Figure 2:
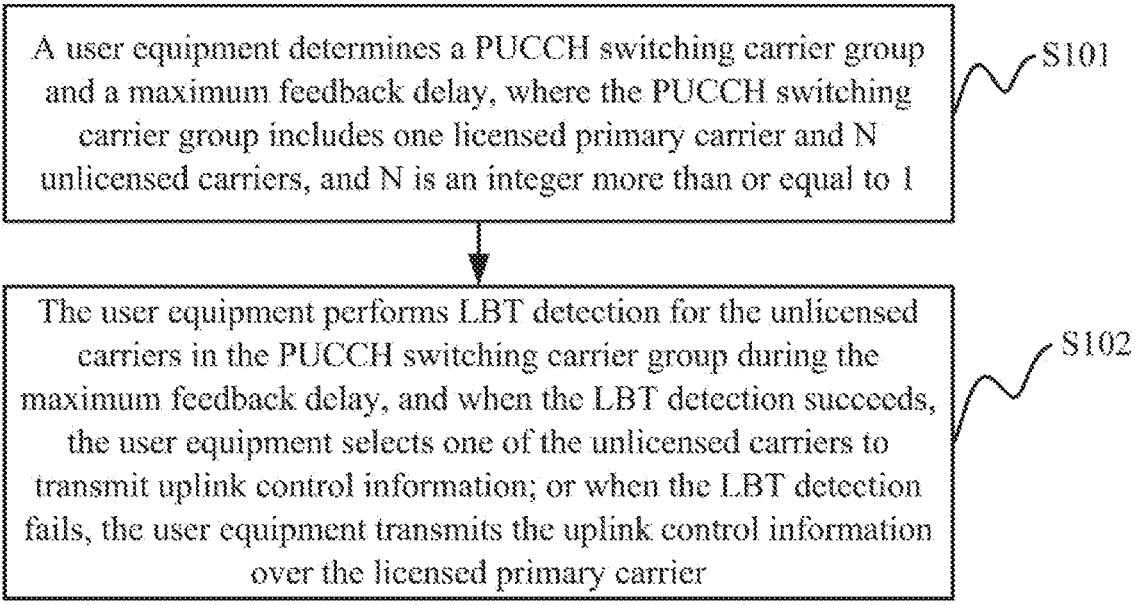
FIG. 2 is a schematic flow chart of a method for transmitting uplink control information at the UE side according to an embodiment of the disclosure.

Referring to FIG. 2, a method for transmitting uplink control information according to an embodiment of the disclosure includes the following operations.

S101: a user equipment determines a PUCCH switching carrier group and a maximum feedback delay. The PUCCH switching carrier group includes one licensed primary carrier and N unlicensed carriers, and N is an integer more than or equal to 1.

In an embodiment, the user equipment can determine the PUCCH switching carrier group and the maximum feedback delay according to configuration information from a base station. The start time of the maximum feedback delay is defined as follows: the maximum delay is counted from time when the base station starts to transmit downlink data corresponding to feedback information; or, the maximum delay is counted from time when the user equipment needs to transmit ACK/NACK feedback.

S102: the user equipment performs LBT detection for the unlicensed carriers in the PUCCH switching carrier group during the maximum feedback delay, and when the LBT detection succeeds, the user equipment selects one of the unlicensed carriers to transmit uplink control information; or when the LBT detection fails, the user equipment transmits the uplink control information over the licensed primary carrier.

In an embodiment, the user equipment can perform LBT detection in a time order during the maximum feedback delay until the LBT detection succeeds. The user equipment can perform LBT detection concurrently on each unlicensed carrier in the PUCCH switching carrier group, and if the LBT detection succeeds over M unlicensed carriers in the PUCCH switching carrier group, then the user equipment selects an actual PUCCH transmission carrier among the M unlicensed carriers under a predetermined rule. M is an integer less than or equal to N. The predetermined rule can be a randomly selected rule, or can be another rule determined according to actual needs, although the embodiment of the disclosure is not limited thereto.

In an embodiment, if the LBT detection performed by the user equipment fails throughout the maximum feedback delay, then the user equipment determines the licensed primary carrier as the actual PUCCH transmission carrier.

The user equipment transmits the uplink control information over the actual PUCCH transmission carrier, and in an embodiment, if the actual PUCCH transmission carrier is the licensed primary carrier, then a PUCCH resource may be obtained in one of the following ways: the base station reserves the PUCCH resource for the user equipment in a last sub-frame during the maximum feedback delay, and if the user equipment transmits the uplink control information earlier over an unlicensed carrier, then the base station may instruct another user equipment to perform transmission over the reserved PUCCH resource; and the base station indicates a PUCCH resource of the licensed primary carrier explicitly to the user equipment upon determining that no uplink control information is received throughout the maximum feedback delay.

Operations at the user equipment side are similar to those at the user equipment side except that the user equipment side needs to perform LBT detection before it transmits the uplink control information over an unlicensed carrier, and it can transmit uplink control information only when the LBT detection succeeds, whereas the base station side needs to perform DTX detection before it receives data, and can demodulate the uplink control information only when the DTX detection succeeds, where the DTX detection succeeds indicates that a PUCCH is transmitted by the user equipment.

Figure 3:
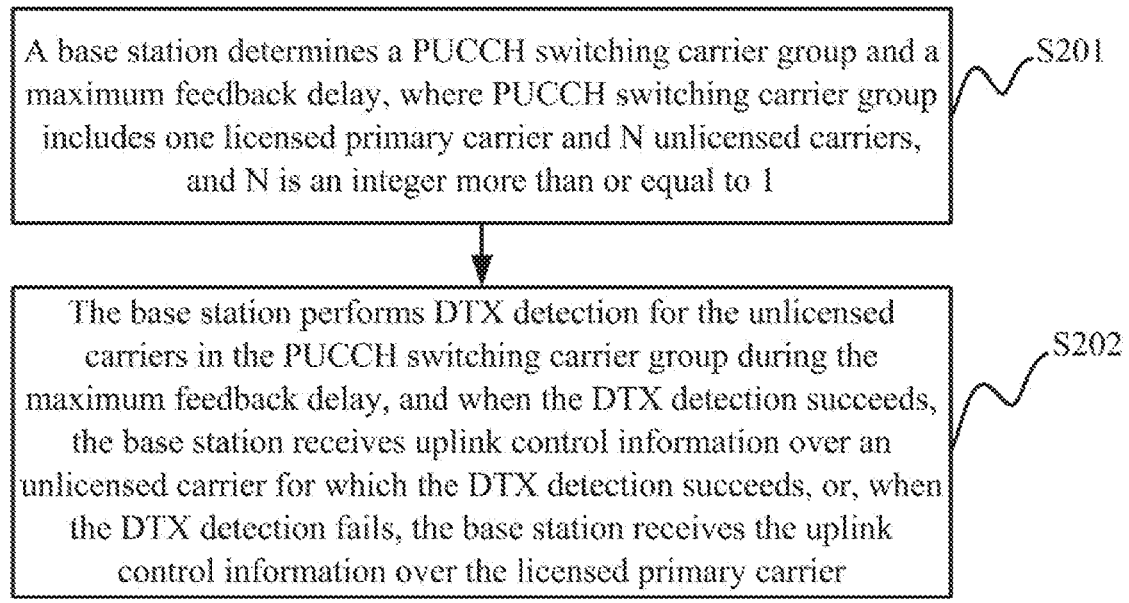
FIG. 3 is a schematic flow chart of a method for transmitting uplink control information at the base station side according to an embodiment of the disclosure.

Accordingly referring to FIG. 3, another method for transmitting uplink control information at the base station side according to an embodiment of the disclosure includes the following operations.

S201: a base station determines a PUCCH switching carrier group and a maximum feedback delay. The PUCCH switching carrier group includes one licensed primary carrier and N unlicensed carriers, and N is an integer more than or equal to 1.

S202: the base station performs DTX detection for the unlicensed carriers in the PUCCH switching carrier group during the maximum feedback delay, and when the DTX detection succeeds, the base station receives uplink control information over an unlicensed carrier for which the DTX detection succeeds, or, when the DTX detection fails, the base station receives the uplink control information over the licensed primary carrier.

In an embodiment, start time of the maximum feedback delay is time when the base station starts to transmit downlink data corresponding to feedback information. Or, the start time of the maximum feedback delay is time when a user equipment needs to start to transmit the feedback information.

In an embodiment, when the base station determines that the uplink control information is to be received over the licensed primary carrier, the base station receives the uplink control information over the licensed primary carrier in a last sub-frame during the maximum feedback delay. Or, when the base station determines that the uplink control information is to be received over the licensed primary carrier, the base station indicates a transmission resource of the uplink control information to a user equipment, and receives the uplink control information over the licensed primary carrier in the transmission resource.

It shall be noted that it is unnecessary for the PUCCH to occupy a sub-frame in the time domain, but the PUCCH may be transmitted in only one or more Orthogonal Frequency Division Multiplexing (OFDM) symbols. Then for transmission of the uplink control information, there are a plurality of PUCCH transmission opportunities in a sub-frame, and no matter in which symbol the LBT detection performed by the user equipment succeeds, the user equipment can transmit the uplink control information directly instead of waiting until the next sub-frame, thereby increasing the probability of transmitting a PUCCH successfully.

Furthermore, in order to support transmission of uplink control information by a plurality of user equipment in a time division mode, the base station can further configure each user equipment to reserve a symbol for LBT detection in an uplink sub-frame. The uplink sub-frame configured with a symbol for LBT detection is referred to as a short sub-frame, and at most 13 OFDM symbols may be occupied by a PUCCH transmitted in the short sub-frame.

In the embodiment of the disclosure, when the user equipment transmits a PUCCH over an unlicensed carrier, the PUCCH may also include uplink control information of a plurality of carriers. The base station can configure the user equipment with a plurality of carrier groups, where each carrier group includes one uplink primary carrier, and uplink control information of all the carriers in the carrier group including the primary carrier is transmitted over the primary carrier.

The uplink control information in the embodiment of the disclosure can be transmitted over a PUCCH or a PUSCH. For example, when there is also uplink data scheduled and transmitted in an actual PUCCH transmission sub-frame, if the user equipment supports concurrent transmission of a PUCCH and a PUSCH, then uplink control information is transmitted in the PUCCH; or, if the user equipment does not support concurrent transmission of a PUCCH and a PUSCH, then uplink control information is transmitted in the PUSCH.

Two particular embodiments are described below.

First Embodiment 10 carriers are aggregated for the user equipment, where a carrier 1 is a licensed primary carrier, and carriers 2 to 10 are unlicensed carriers. The carriers 1 to 5 belong to a carrier group A, the carriers 6 to 10 belong to a carrier group B, the carrier 1 is a primary carrier in the carrier group A. and the carrier 6 is a primary carrier in the carrier group B. The base station configures the carrier 1 and the carrier 6 as a PUCCH switching carrier group, that is, the PUCCH switching carrier group includes the carrier 1 and the carrier 6. The base station configures the maximum feedback delay as 10 ms, where the maximum feedback delay is predefined to be counted from time when the base station starts to transmit downlink data corresponding to feedback information. The user equipment needs to feed back uplink control information for the sub-frame n over the carrier 6 and over the carrier 10. The base station indicates to the user equipment that the sub-frame n+4 is time when uplink control information needs to be transmitted, and the maximum feedback delay is counted from the sub-frame n. An implementation process of the first embodiment is described through the following different instances.

In a first instance, the user equipment performs LBT detection in the sub-frame n+4 of the carrier 6, and if a detection result indicates that the carrier 6 is idle, then the user equipment transmits uplink control information of the carrier 6 and of the carrier 10 in the sub-frame n+4 of the carrier 6. Correspondingly the base station performs DTX detection in the sub-frame n+4 of the carrier 6, and receives the uplink control information upon detecting a transmitted PUCCH.

In a second instance, the user equipment performs LBT detection in the sub-frame n+4 of the carrier 6, and if a detection result indicates that the carrier 6 is busy, then the user equipment continues to perform LBT detection in the sub-frame n+5 of the carrier 6. The LBT detect succeeds before the sub-frame n+10, and then the user equipment transmits the uplink control information of the carrier 6 and of the carrier 10 in the sub-frame in which the LBT detection succeeds. Correspondingly the base station firstly performs DTX detection in the sub-frame n+4 of the carrier 6, but does not detect any transmitted PUCCH. The base station continues to perform DTX detection throughout subsequent sub-frames until a transmitted PUCCH is detected, and then the base station receives the uplink control information.

In a third instance, the user equipment performs LBT detection in the sub-frame n+4 to the sub-frame n+10 of the carrier 6, but all the detection results indicate that the carrier is busy, so the user equipment transmits the uplink control information over a PUCCH resource reserved in the sub-frame n+10 of the licensed primary carrier (i.e., the carrier 1). Correspondingly, the base station does not detect any transmitted PUCCH in the sub-frame n+4 to the sub-frame n+10 of the carrier 6, and receives the uplink control information in the sub-frame n+10 of the licensed primary carrier (i.e., the carrier 1).

Second Embodiment 10 carriers are aggregated for the user equipment. A carrier 1 is a licensed primary carrier, and carriers 2 to 10 are unlicensed carriers. The carriers 1 to 5 belong to a carrier group A, the carriers 6 to 10 belong to a carrier group B, the carrier 1 is a primary carrier in the carrier group A, and the carrier 6 is a primary carrier in the carrier group B. The base station configures the carrier 1 and the carriers 6 to 10 as a PUCCH switching carrier group, that is, the PUCCH switching carrier group includes the carrier 1 and the carriers 6 to 10. The base station configures the maximum feedback delay as 5 ms, where the maximum feedback delay is counted from time when the user equipment needs to transmit ACK/NACK feedback information. The user equipment needs to feed back uplink control information for the sub-frame n over the carrier 6 and over the carrier 10, and the base station indicates to the user equipment that the sub-frame n+4 is time when the uplink control information needs to be transmitted, and the maximum feedback delay is counted from the sub-frame n+4. An implementation process of the second embodiment is described through the following different instances.

In a first instance, the user equipment performs LBT detection in the sub-frame n+4 of the carriers 6 to 10. Detection results over the carrier 6 and over the carrier 10 indicate that the carrier 6 and the carrier 10 are busy, and detection results over the carriers 7 to 9 indicate that the carriers 7 to 9 are idle, so the user equipment selects the sub-frame n+4 over the carrier 7 as an actual PUCCH transmission position. Correspondingly the base station performs DTX detection in the sub-frame n+4 of the carriers 6 to 10, and receives the uplink control information upon detecting a transmitted PUCCH in the sub-frame n+4 over the carrier 7.

In a second instance, the user equipment performs LBT detection in the sub-frame n+4 of the carriers 6 to 10, and all the detection results indicate that the carrier 6 to the carrier 10 are busy. Then the user equipment continues to perform LBT detection in the sub-frame n+5 of the carriers 6 to 10, and the LBT detection succeeds before the sub-frame n+9, so the user equipment selects one of the carriers 6 to 10 in the sub-frame in which the LBT detection succeeds, under a predefined rule, to transmit uplink control information of the carrier 6 and of the carrier 10.

In a third instance, the user equipment performs LBT detection in the sub-frame n+4 to the sub-frame n+9 of the carriers 6 to 10, and all the detection results indicate that the carriers 6 to 10 are busy, and the base station does not detect any transmitted PUCCH in the sub-frame n+4 to the sub-frame n+9 of the carriers 6 to 10, so the base station indicates a PUCCH resource over the licensed primary carrier (i.e., the carrier 1), in the sub-frame n+13 over the licensed primary carrier. The user equipment receives the PUCCH resource indicated by the base station in the sub-frame n+13, and transmits uplink control information over the licensed primary carrier (i.e., the carrier 1) in the sub-frame n+13. Correspondingly the base station receives the uplink control information over the licensed primary carrier (i.e., the carrier 1) in the sub-frame n+13.

Figure 4:
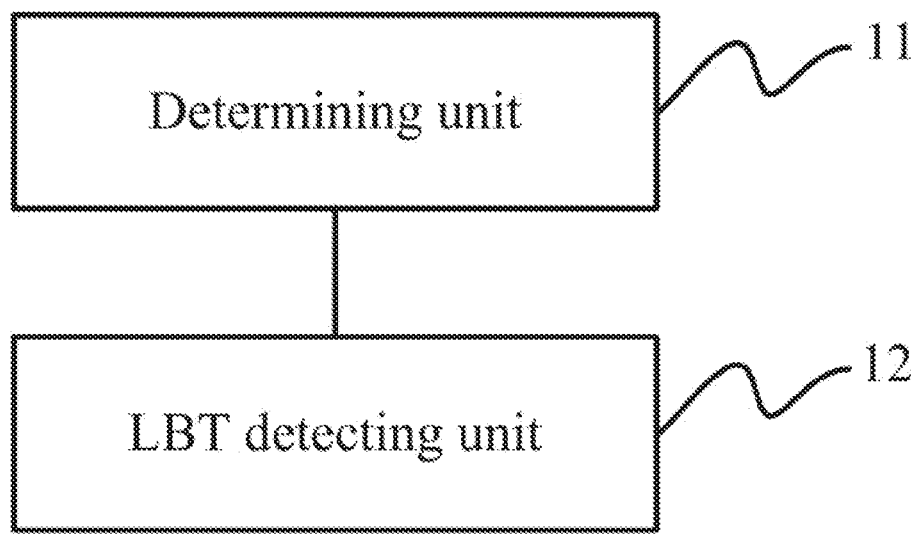
FIG. 4 is a schematic structural diagram of an apparatus for transmitting uplink control information at the UE side according to an embodiment of the disclosure.

Referring to FIG. 4, an apparatus for transmitting uplink control information at the user equipment side according to an embodiment of the disclosure includes a determining unit 11 and an LBT detecting unit 12.

The determining unit 11 is configured to determine a PUCCH switching carrier group and a maximum feedback delay. The PUCCH switching carrier group includes one licensed primary carrier and N unlicensed carriers, and N is an integer more than or equal to 1.

The LBT detecting unit 12 is configured to: perform LBT detection for the unlicensed carriers in the PUCCH switching carrier group during the maximum feedback delay, and when the LBT detection succeeds, select one of the unlicensed carriers to transmit uplink control information; or when the LBT detection fails, transmit the uplink control information over the licensed primary carrier.

In an embodiment, start time of the maximum feedback delay is time when a base station starts to transmit downlink data corresponding to feedback information. Or, the start time of the maximum feedback delay is time when a user equipment needs to start to transmit the feedback information.

In an embodiment, if the LBT detection performed by the LBT detecting unit succeeds over M unlicensed carriers in the PUCCH switching carrier group, then the LBT detecting unit selects an unlicensed carrier among the M unlicensed carriers under a preset rule to transmit the uplink control information. M is an integer less than or equal to N.

In an embodiment, when the LBT detecting unit transmits the uplink control information over the licensed primary carrier, the LBT detecting unit transmits the uplink control information over the licensed primary carrier in a last sub-frame during the maximum feedback delay. Or, when the LBT detecting unit transmits the uplink control information over the licensed primary carrier, the LBT detecting unit receives a transmission resource of the uplink control information indicated by a base station, and transmits the uplink control information over the licensed primary carrier in the transmission resource.

Figure 5:
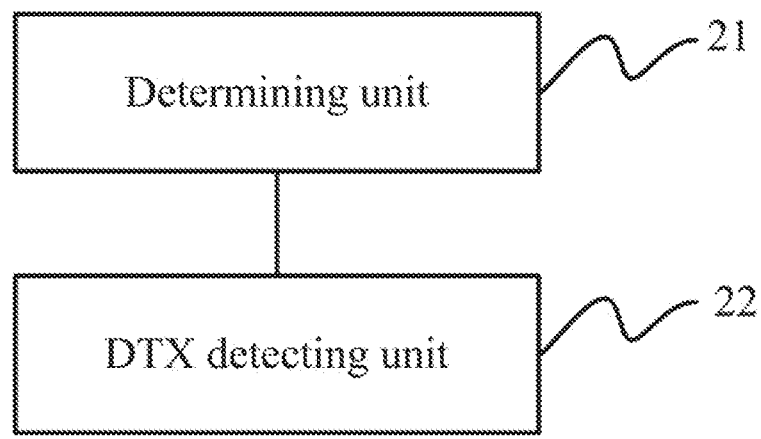
FIG. 5 is a schematic structural diagram of an apparatus for transmitting uplink control information at the base station side according to an embodiment of the disclosure.

Referring to FIG. 5, an apparatus for transmitting uplink control information at the base station side according to an embodiment of the disclosure includes a determining unit 21 and a DTX detecting unit 22.

The determining unit 21 is configured to determine a PUCCH switching carrier group and a maximum feedback delay. The PUCCH switching carrier group includes one licensed primary carrier and N unlicensed carriers, and N is an integer more than or equal to 1.

The DTX detecting unit 22 is configured to: perform DTX detection for the unlicensed carriers in the PUCCH switching carrier group during the maximum feedback delay, and when the DTX detection succeeds, receive uplink control information over an unlicensed carrier for which the DTX detection succeeds; or when the DTX detection fails, receive the uplink control information over the licensed primary carrier.

In an embodiment, start time of the maximum feedback delay is time when a base station starts to transmit downlink data corresponding to feedback information. Or, the start time of the maximum feedback delay is time when a user equipment needs to start to transmit feedback information.

In an embodiment, when the DTX detecting unit determines that uplink control information is to be received over the licensed primary carrier, the DTX detecting unit receives the uplink control information over the licensed primary carrier in a last sub-frame during the maximum feedback delay. Or, when the DTX detecting unit determines that uplink control information is to be received over the licensed primary carrier, the DTX detecting unit indicates a transmission resource of the uplink control information to a user equipment, and receives the uplink control information over the licensed primary carrier in the transmission resource.

Figure 6:
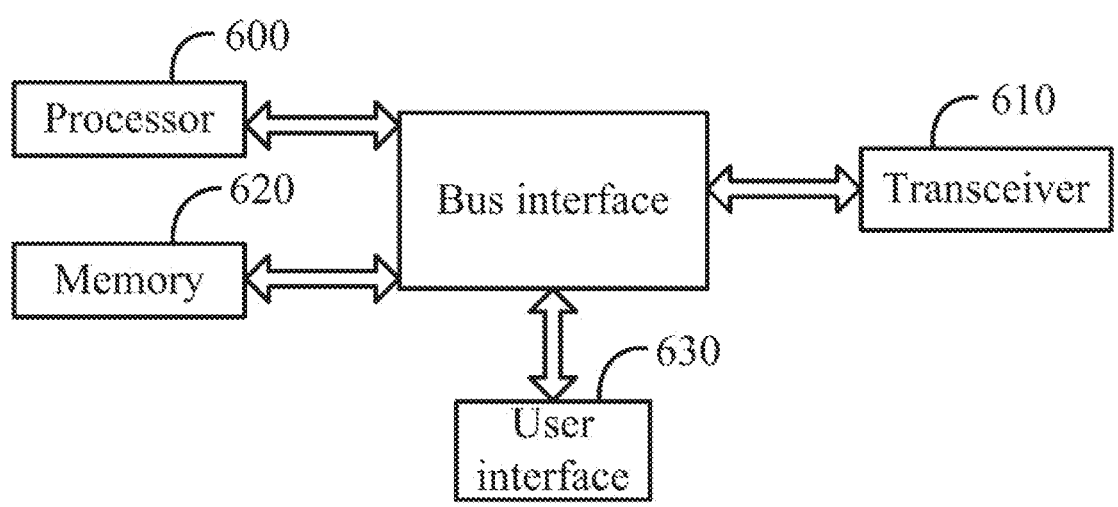
FIG. 6 is a schematic structural diagram of another apparatus for transmitting uplink control information at the UE side according to an embodiment of the disclosure.

Referring to FIG. 6, another apparatus for transmitting uplink control information at the user equipment side according to an embodiment of the disclosure includes a processor 600, a memory 620 and a transceiver 610. The processor 600 configured to read and execute a program in the memory 620 to: determine a PUCCH switching carrier group and a maximum feedback delay, where the PUCCH switching carrier group includes one licensed primary carrier and N unlicensed carriers, and N is an integer more than or equal to 1; perform LBT detection for the unlicensed carriers in the PUCCH switching carrier group during the maximum feedback delay; and when the LBT detection succeeds, select one of the unlicensed carriers to transmit uplink control information through the transceiver 610; or when the LBT detection fails, control the transceiver 610 to transmit the uplink control information over the licensed primary carrier.

In an embodiment, start time of the maximum feedback delay is time when a base station starts to transmit downlink data corresponding to feedback information. Or, the start time of the maximum feedback delay is time when a user equipment needs to start to transmit the feedback information.

In an embodiment, if the LBT detection performed by the processor 600 succeeds over M unlicensed carriers in the PUCCH switching carrier group, then the processor 600 selects an unlicensed carrier among the M unlicensed carriers under a preset rule to transmit the uplink control information through the transceiver 610. M is an integer less than or equal to N.

In an embodiment, when the processor 600 controls the transceiver 610 to transmit the uplink control information over the licensed primary carrier, the processor 600 controls the transceiver 610 to transmit the uplink control information over the licensed primary carrier in a last sub-frame during the maximum feedback delay. Or, when the processor 600 controls the transceiver 610 to transmit the uplink control information over the licensed primary carrier, the processor 600 controls the transceiver 610 to receive a transmission resource of the uplink control information indicated by a base station, and controls the transceiver 610 to transmit the uplink control information over the licensed primary carrier in the transmission resource.

The transceiver 610 is configured to receive and transmit data under the control of the processor 600.

Here in FIG. 6, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. A bus interface serves as an interface. The transceiver 1002 can be a number of elements, e.g., a transmitter and a receiver, which are units for communication with various other devices over a transmission medium. For different user equipments, the user interface 630 can also be an interface via which devices are connected internally and externally as needed, where the connected devices include but will not be limited to a keypad, a display, a loudspeaker, a microphone, a joystick, etc.

The processor 600 is responsible for managing the bus architecture and performing normal processes, and the memory 620 can be configured to store data for use by the processor 600 in performing the operations.

Figure 7:
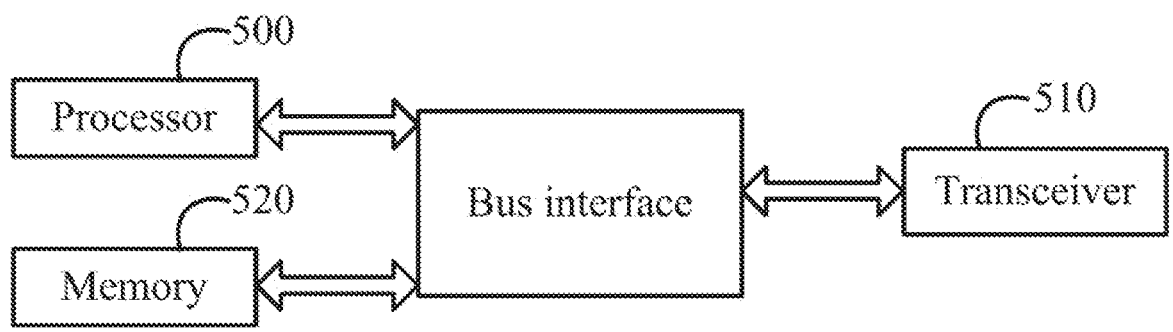
FIG. 7 is a schematic structural diagram of another apparatus for transmitting uplink control information at the base station side according to an embodiment of the disclosure.

Referring to FIG. 7, another apparatus for transmitting uplink control information at the base station side according to an embodiment of the disclosure includes: a processor 500, a transceiver 510 and a memory 520.

The processor 500 is configured to read and execute a program in the memory 520 to: determine a PUCCH switching carrier group and a maximum feedback delay, where the PUCCH switching carrier group includes one licensed primary carrier and N unlicensed carriers, and N is an integer more than or equal to 1; perform DTX detection for the unlicensed carriers in the PUCCH switching carrier group during the maximum feedback delay; and when the DTX detection succeeds, control the transceiver 510 to receive uplink control information over an unlicensed carrier for which the DTX detection succeeds; or when the DTX detection fails, control the transceiver 510 to receive the uplink control information over the licensed primary carrier.

In an embodiment, start time of the maximum feedback delay is time when a base station starts to transmit downlink data corresponding to feedback information. Or, the start time of the maximum feedback delay is time when a user equipment needs to start to transmit the feedback information.

In an embodiment, when the processor 500 determines that the uplink control information is to be received over the licensed primary carrier, the processor 500 controls the transceiver 510 to receive uplink control information over the licensed primary carrier in a last sub-frame during the maximum feedback delay. Or, when the processor 500 determines that the uplink control information is to be received over the licensed primary carrier, the processor 500 indicates a transmission resource of the uplink control information to a user equipment, and processor 500 controls the transceiver 510 to receive the uplink control information over the licensed primary carrier in the transmission resource.

In summary, in the embodiments of the disclosure, the user equipment failing to preempt a channel over an unlicensed carrier switches to another sub-frame or another carrier to transmit a PUCCH. As compared with the existing technology where if the user equipment performs LBT detection over an unlicensed carrier but the LBT detection fails, then the user equipment cannot transmit data over an unlicensed carrier, so the user equipment cannot transmit a PUCCH in effect and in a timely manner. Whereas in the embodiments of the disclosure, the user equipment can switch between sub-frames and carriers to transmit an uplink control channel. In a case where the user equipment does not preempt any resource of an unlicensed carrier, it can wait until the carrier is idle again to transmit uplink control information, or can switch to another idle unlicensed carrier to transmit the uplink control information, and if the unlicensed carriers are all inaccessible for a specified period of time, then the user equipment can switch to the licensed primary carrier to transmit the uplink control information, so that uplink control information can be transmitted correctly in a timely manner.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for transmitting uplink control information, comprising:
   determining, by a user equipment, a Physical Uplink Control Channel (PUCCH) switching carrier group and a maximum feedback delay, wherein the PUCCH switching carrier group comprises one licensed primary carrier and N unlicensed carriers, N is an integer more than or equal to 1, and end time of the maximum feedback delay is latest time when the user equipment transmits feedback information;
   performing, by the user equipment, Listen Before Talk (LBT) detection for the unlicensed carriers in the PUCCH switching carrier group during the maximum feedback delay; and
   when the LBT detection succeeds, selecting one of the unlicensed carriers to transmit uplink control information; or
   when the LBT detection fails, transmitting the uplink control information over the licensed primary carrier.

2. The method according to claim 1, wherein start time of the maximum feedback delay is time when a base station starts to transmit downlink data corresponding to the feedback information.

3. The method according to claim 1, wherein if the LBT detection performed by the user equipment succeeds over M unlicensed carriers in the PUCCH switching carrier group, then the user equipment selects an unlicensed carrier among the M unlicensed carriers under a preset rule to transmit the uplink control information, wherein M is an integer less than or equal to N.

4. The method according to claim 1, wherein when the user equipment transmits the uplink control information over the licensed primary carrier, the user equipment transmits the uplink control information over the licensed primary carrier in a last sub-frame during the maximum feedback delay.

5. The method according to claim 1, wherein start time of the maximum feedback delay is start time when the user equipment needs to transmit the feedback information.

6. The method according to claim 1, wherein when the user equipment transmits the uplink control information over the licensed primary carrier, the user equipment receives a transmission resource of the uplink control information indicated by a base station, and transmits the uplink control information over the licensed primary carrier in the transmission resource.

7. A method for transmitting uplink control information, comprising:
   determining, by a base station, a Physical Uplink Control Channel (PUCCH) switching carrier group and a maximum feedback delay, wherein the PUCCH switching carrier group comprises one licensed primary carrier and N unlicensed carriers, N is an integer more than or equal to 1, and end time of the maximum feedback delay is latest time when a user equipment transmits feedback information; and
   performing, by the base station, Discontinuous Transmission (DTX) detection for the unlicensed carriers in the PUCCH switching carrier group during the maximum feedback delay; and
   when the DTX detection succeeds, receiving uplink control information over an unlicensed carrier for which the DTX detection succeeds; or
   when the DTX detection fails, receiving the uplink control information over the licensed primary carrier.

8. The method according to claim 7, wherein start time of the maximum feedback delay is time when the base station starts to transmit downlink data corresponding to the feedback information.

9. The method according to claim 7, wherein when the base station determines that the uplink control information is to be received over the licensed primary carrier, the base station receives the uplink control information over the licensed primary carrier in a last sub-frame during the maximum feedback delay.

10. The method according to claim 7, wherein start time of the maximum feedback delay is start time when a user equipment needs to transmit the feedback information.

11. The method according to claim 7, wherein when the base station determines that the uplink control information is to be received over the licensed primary carrier, the base station indicates a transmission resource of the uplink control information to a user equipment, and receives the uplink control information over the licensed primary carrier in the transmission resource.

12. An apparatus for transmitting uplink control information, comprising:
   a transmitter;
   a memory storing at least one instruction; and
   a processor configured to execute the at least one instruction to:
   determine a Physical Uplink Control Channel (PUCCH) switching carrier group and a maximum feedback delay, wherein the PUCCH switching carrier group comprises one licensed primary carrier and N unlicensed carriers, N is an integer more than or equal to 1, and end time of the maximum feedback delay is latest time when the apparatus transmits feedback information;
   perform Listen Before Talk (LBT) detection for the unlicensed carriers in the PUCCH switching carrier group during the maximum feedback delay; and
   when the LBT detection succeeds, select one of the unlicensed carriers to transmit uplink control information; or when the LBT detection fails, control the transmitter to transmit the uplink control information over the licensed primary carrier.

13. The apparatus according to claim 12, wherein start time of the maximum feedback delay is time when a base station starts to transmit downlink data corresponding to the feedback information.

14. The apparatus according to claim 12, wherein the processor is further configured to execute the at least one instruction to:
   if the LBT detection performed by the processor succeeds over M unlicensed carriers in the PUCCH switching carrier group, then select an unlicensed carrier among the M unlicensed carriers under a preset rule to transmit the uplink control information, wherein M is an integer less than or equal to N.

15. The apparatus according to claim 12, wherein the processor is further configured to execute the at least one instruction to control the transmitter to transmit the uplink control information over the licensed primary carrier in a last sub-frame during the maximum feedback delay.

16. The apparatus according to claim 12, wherein start time of the maximum feedback delay is start time when the apparatus needs to transmit the feedback information.

17. The apparatus according to claim 12, further comprising a receiver, where the processor is further configured to execute the at least one instruction to:

control the receiver to receive a transmission resource of the uplink control information indicated by a base station; and control the transmitter to transmit the uplink control information over the licensed primary carrier in the transmission resource.

\* \* \* \* \*